United States Patent [19]
Schleimer et al.

[11] 4,439,234
[45] Mar. 27, 1984

[54] METHOD OF INCREASING THE COLD MATERIAL CHARGING CAPACITY IN THE TOP-BLOWING PRODUCTION OF STEEL

[75] Inventors: François Schleimer; Romain Henrion; Ferdinand Goedert; Fernand Thill, all of Esch-sur-Alzette, Luxembourg

[73] Assignee: Arbed S.A., Luxembourg, Luxembourg

[21] Appl. No.: 466,843

[22] Filed: Feb. 16, 1983

[30] Foreign Application Priority Data

Feb. 17, 1982 [LU] Luxembourg ............................ 83954

[51] Int. Cl.³ .............................................. C21C 7/02
[52] U.S. Cl. .......................................... 75/52; 75/59; 75/60
[58] Field of Search ................................. 75/52, 59, 60

[56] References Cited

U.S. PATENT DOCUMENTS 3,854,932 12/1974 Bishop ..................................... 75/59
4,329,171  5/1982 Robert ..................................... 75/52
4,365,992 12/1982 Sieckman ............................... 75/52

OTHER PUBLICATIONS

Article in *Iron and Steel Engineer*, 58, No. 12, Dec. 1981, pp. 34–38, by Francis Schleimer et al. "Development of the LBE Process."

*Primary Examiner*—Peter D. Rosenberg
*Attorney, Agent, or Firm*—Karl F. Ross; Herbert Dubno

[57] ABSTRACT

Pig iron is refined by top blowing with oxygen and injecting inert gas from the bottom. The slag formation is minimized by controlled addition of lime to match the formation of slag components as they are generated by the process. This increases the capacity of the melt to receive a cold charge, e.g. of scrap.

12 Claims, No Drawings

METHOD OF INCREASING THE COLD MATERIAL CHARGING CAPACITY IN THE TOP-BLOWING PRODUCTION OF STEEL

CROSS REFERENCE TO RELATED PATENTS

This application is related to the commonly assigned U.S. Pat. No. 4,345,746 (corresponding to Luxembourg Patent No. LU 81.859), its parent application which matured into U.S. Pat. No. 4,325,730, and to the commonly owned U.S. Pat. No. 4,349,382 (corresponding to Luxembourg Patent No. 81.207).

FIELD OF THE INVENTION

Our present invention relates to the top-blowing refining of a ferrous melt and, more particularly to the production of steel by top blowing of oxygen onto an iron melt to which cold materials can be added to form a portion of the charge.

Specifically the invention relates to a method of increasing the charge of cold materials, such as steel scrap, iron ore, sponge iron, pre-reduced ore pellets and the like, which can be added in a process for refining pig iron, in which the oxygen is delivered by top blowing.

BACKGROUND OF THE INVENTION

Luxembourg Patents LU No. 81.207 and LU No. 81.859 describe a process for refining pig iron, based on influencing the physical properties of the slags as well as the kinetics of the decarburization reactions in the converter, by a directed introduction of inert gases through the bottom of the vessel.

The treatment of molten metal and slags with inert gases makes it possible to prevent the slag from developing a foamy consistency, thus avoiding the formation of a voluminous thermally insulating layer on top of the metal bath. Furthermore the kinetics of the oxidation of the carbon contained in the bath by the top-blown oxygen become controllable.

In these systems, a layer of foam-free slag floats on the surface of the metal. By contrast with earlier, conventional processes, a much higher afterburning of CO-gases generated during the decarburizing of the bath takes place right on the surface of the bath, whereby a larger portion of the energy liberated during afterburning is transferred to the bath itself since the foam-free slag layer hinders the heat transfer less than a foam layer would.

Thanks to this increased availability of energy compared to conventional blowing processes, this method allows for scrap charges in the order of 450 kg/Ton of steel to be fed to the melt. Charges of this magnitude prohibitively cooled earlier melts.

OBJECTS OF THE INVENTION

It is the principal object of the invention to provide an improved method of operating a top-blowing oxygen refining installation whereby the charge of cold material into the refining melt may be augmented.

Another object of our invention is to provide a method of increasing the cold material which can be charged in the top-blown oxygen refining of pig iron to steel.

Still another object of this invention is to extend the principles of the aforedescribed U.S. and Luxembourg patents.

It is yet another object of the invention to provide an improved method of refining pig iron to steel by top-blowing the same with an oxygen-containing gas whereby hitherto-existing limits upon the amount of the cold charge which can be supplied are eliminated.

SUMMARY OF THE INVENTION

These objects are attained through the method according to the invention, which has as its key point that the amount of slag is generally reduced to an absolute minimum during the refining process by adding slag-forming lime only gradually and in proportion with the build-up of the slagging materials.

A further feature of the method according to the invention consists in the extension of the decarburization period into the periods which have hitherto been considered interruptions or intervals in decarburization. This is possible, without risks such as boiling over, due to the reduction of the slag to an absolute minimum according to the invention and leads to an essential increase in the efficiency of the afterburning of the generated carbon monoxide in the immediate vicinity of the metal bath. At the same time, the transfer of the heat generated during afterburning to the almost slag-free metal bath is increased.

Furthermore, the extended decarburization period makes possible to improve the thermal output through the addition of any external energy carrier from above in the converter, whereby these additions are advantageously provided through an oxygen/solids blow-lance.

If the external energy carrier is a solid carbon carrier, the addition, in accordance to the invention, takes place at an appropriate moment reached when the melt has a content of carbon of less than 2%.

The sequence of the steps of the method according to the invention can be outlined as follows:

Open-hearth pig iron with an advantageous proportion of Si:Mn of 1:1 and cold materials are introduced into the converter. A first refining stage is undertaken, under the blowing of oxygen and flushing of the melt with inert gas. The elements silicon and manganese are oxidized before decarburization is complete and the oxides $SiO_2$ and $MnO$ form a non-reactive slag. This stage is considered finished when the formation of CO has started, which is determinable by continuous sound-level measurements and/or an analysis of gas emission.

A second two-part refining stage follows in the form of an intentionally extended decarburization period during which an addition of external energy carriers can take place, and a dephosphorization/desulfurization period, with addition of lime.

The decarburization stage is characterized by the fact that the decarburization, commonly in the range of 600 kg°C./minute with peaks up to 800 kg°C./minute, is reduced to rates of less than 400 kg°C./minute. To this effect, the supply of primary oxygen is reduced, while the secondary oxygen-supply is increased for the benefit of the afterburning.

The efficiency of the afterburning, which according to the aforementioned state of the art ranges between 15 and 27% is boosted to approximately 40%, due to the method according to the invention.

After the subsequent period of dephosphorization/desulfurization, during which the addition of lime is necessary, the steel is tapped out as in the conventional LD-process and the remaining slag is removed from the converter and not reused metallurgically.

Advantageously, the same steps of the method are followed when open hearth pig iron is used, corresponding to those required in the refining of phosphorous pig iron. For improvement of the steel quality and for an ingenious use of the slag-forming elements a two-stage process, with intermediate slag removal, is carried out, having the following chronological steps:

the Si, Mn-oxidation period;

the extended decarburization period with possible addition of external energy carriers;

a preliminary dephosphorization/desulfurization period with addition of fluid and highly-basic slag formed in the previous charge;

a slag removal, whereby the removed slag is not reused metallurgically;

a final dephosphorization/desulfurization period with formation of highly-basic slag;

the tapping out of the steel; and a transfer of the remaining highly-basic slag to a pot, to be reused during the pre-dephosphorization/desulfurization period of the next charge.

The improvements attainable through the method according to the invention regarding the efficiency of the afterburning and also regarding the capacity in charges of cold materials are shown in the following practical examples; these refer to:

|  | (A) phosphorous pig iron; | (B) open hearth pig iron |
|---|---|---|
| % C | 4.2 | 4.3 |
| % Mn | 0.25 | 0.7 |
| % P | 1.6 | 0.1 |
| % S | 0.025 | 0.025 |
| % Si | 0.5 | 0.7 |
| Temperature | 1340° C. | 1360° C. |

Given are:

The degree of afterburning: $x = \% CO_2/(\% CO + \% CO_2)$ (Determination through the continuous analysis of emission gases)

The charge of pig iron: R (kg/Ton)

The charge of cold material: K (kg scrap/Ton)

The charge of lime: Ca (kg/Ton)

The total amount of oxygen: O (Nm³/Ton)

The charge of external energy carrier: C (kg coal/Ton)

The duration of the decarburization stage: dC (minutes)

|  | Conventional Method |  | Method according to the invention |  |
|---|---|---|---|---|
| (A) | x | 0.15 | x | 0.40 | 0.40 |
|  | R | 700 | R | 633 | 600 |
|  | K | 400 | K | 464 | 500 |
|  | Ca | 80 | Ca | 72 | 69 |
|  | O | 57 | O | 59 | 64 |
|  | C | 0 | C | 0 | 5.7 |
|  | dC | 6 | dC | 8 | 10 |
| (B) | x | 0.15 | x | 0.40 | 0.40 |
|  | R | 777 | R | 693 | 600 |
|  | K | 323 | K | 407 | 500 |
|  | Ca | 64 | Ca | 57 | 49 |
|  | O | 55 | O | 58 | 69 |
|  | C | 0 | C | 0 | 14.8 |
|  | dC | 6 | dC | 8 | 14 |

We claim:

1. In a method of refining a pig iron melt which comprises top-blowing said melt with oxygen while introducing an inert gas into the bottom of said melt and incorporating a cold solid charge into the melt, the improvement which comprises minimizing slag formation on said melt by adding slag-forming lime to said melt only in proportion to the buildup of slag components therein by the refining operation and over the duration of such buildup, thereby increasing the charge-receiving capacity of the melt.

2. The movement defined in claim 1, wherein in a first stage, pig iron and a charge of cold materials are introduced into a converter and silicon and manganese are oxidized by oxygen blowing, until the oxidation of the carbon is initiated.

3. The improvement defined in claim 2, wherein in a second stage a decarburization is carried out with a decarburizing rate below 400 kg°C./minute followed by a dephosphorization/desulfurization reaction during which lime is added.

4. The improvement defined in claim 1, wherein in order to increase the thermal output during the decarburization period external energy carriers are introduced in the converter above.

5. The improvement defined in claim 2, wherein in order to increase the thermal output during the decarburization period external energy carriers are introduced in the converter above.

6. The improvement defined in claim 3, wherein in order to increase the thermal output during the decarburization period external energy carriers are introduced in the converter above.

7. The improvement defined in claim 4, wherein said energy carriers are solid carbon, the addition taking place when the carbon content of the melt is less than 2%.

8. The improvement defined in claim 5, wherein said energy carriers are solid carbon, the addition taking place when the carbon content of the melt is less than 2%.

9. The improvement defined in claim 6, wherein said energy carriers are solid carbon, the addition taking place when the carbon content of the melt is less than 2%.

10. The improvement defined in claim 3, wherein after the dephosphorization/desulfurization, the steel is tapped and the slag removed and the slag is not reused metallurgically.

11. The improvement defined in claim 1, wherein the method comprises an intermediate slag removal and the refining process consists chronologically of the following:

the Si, Mn oxidation period;

the extended decarburization period with possible addition of external energy carriers;

a preliminary dephosphorization/desulfurization period with addition of fluid and highly-basic slag formed in the previous charge;

a slag removel, whereby the slag is not reused metallurgically;

a final dephosphorization/desulfurization period, with formation of a highly-basic slag;

the tapping out of the steel; and a transfer of the remaining highly-basic slag to a pot to be reused during the preliminary dephosphorization/desulfurization period of the next charge.

12. A method of refining a pig iron melt to steel, comprising the steps of:

(a) introducing molten pig iron containing silicon and manganese in a weight ratio of substantially 1:1 into a converter;

(b) introducing a charge of cold material selected from the group which consists of steel scrap, iron ore, and pre-reduced ore into said converter;

(c) top blowing the resulting melt in said converter with oxygen while flushing said melt with an inert gas introduced into the bottom of said melt to oxidize the silicon and manganese and form $SiO_2$ and MnO in a nonreactive slag on said melt;

(d) detecting the formation of CO above said melt and terminating step (c) upon such detection;

(e) after the termination of step (c) effecting an extended decarburization of the melt by top blowing the same with oxygen to which solid carbon is added while introducing inert gas into the bottom of the melt;

(f) metering lime into the melt in proportion to the $SiO_2$ and MnO formed therein to minimize the slag, the decarburization being carried out at a rate of at most 400 kg C./minute and the carbon monoxide thus formed being burned above the melt with an efficiency of about 40%;

(g) effecting a dephosphorization and desulfurization of the melt with addition of lime; and (h) tapping the thus refined melt.

* * * * *